Nov. 7, 1950 — H. LOMBARD — 2,528,600
AIR INLET VENT
Filed Nov. 26, 1943
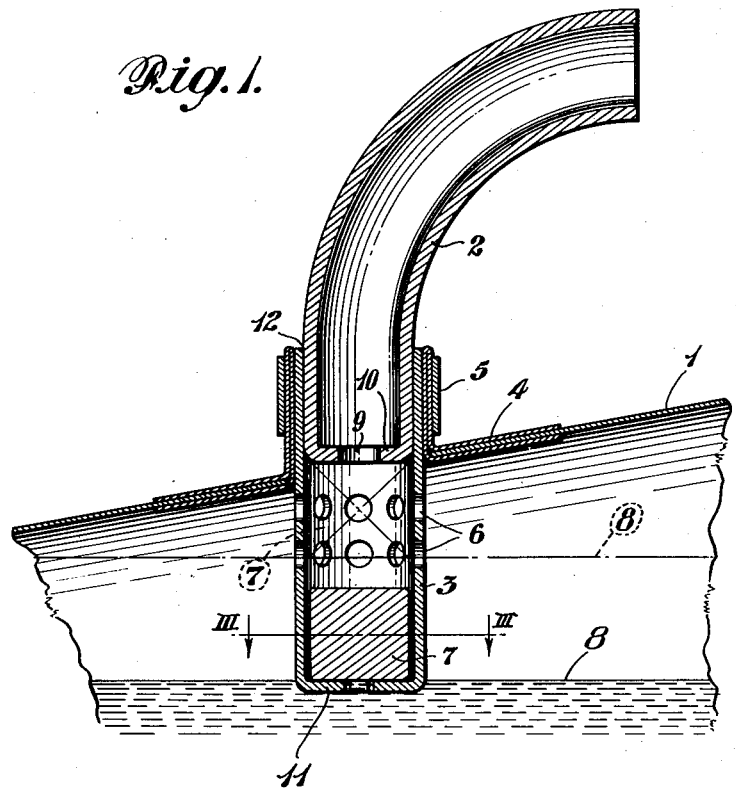
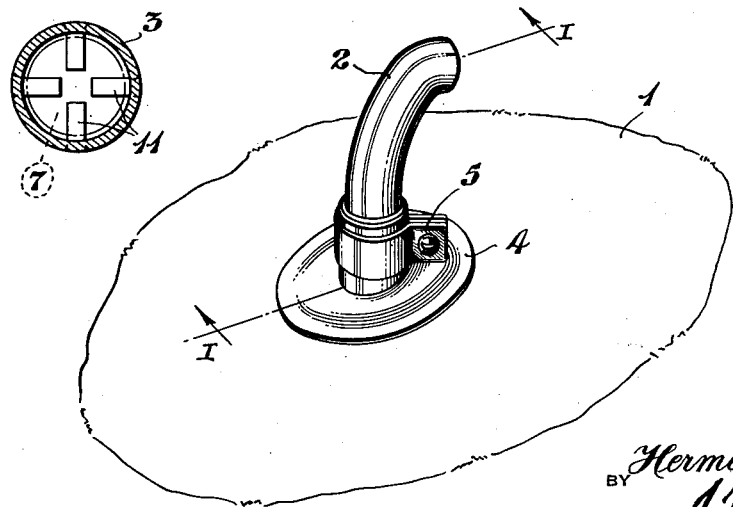
INVENTOR
Herman Lombard Patented Nov. 7, 1950

2,528,600

UNITED STATES PATENT OFFICE 2,528,600

AIR INLET VENT

Herman Lombard, United States Navy

Application November 26, 1943, Serial No. 511,861

5 Claims. (Cl. 137—69)

(Granted under the act of March 3, 1883, as amended April 30, 1928; 370 O. G. 757)

This invention deals generally with air vents for liquid supply tanks which are subject to displacement from a normal upright position while in use. In such tanks, while a vent is required so as to ensure a free withdrawal of the liquid therefrom during the normal supply operation, it is also necessary to provide some means for preventing spilling of the liquid through the vent when the tanks are tilted.

The object of the present invention is to construct a device for supplying a tank of the above type with a vent which is automatically closed off whenever the liquid attempts to spill therethrough.

Another object is to form a fitting for mounting in the top of any tank for the purpose of providing a vent in combination with a float valve for closing off the vent whenever the tank is tilted or turned so as to bring the liquid level up to the vent.

Another object is to make this device out of simple standard parts in a simple inexpensive manner.

Other more specific objects will become apparent as the device is described in detail having reference to the accompanying drawings, wherein:

Fig. 1 is a sectional view taken at I—I in Fig. 2 through one form of the device made in accordance with this invention, Fig. 2 is a perspective view thereof on a smaller scale, and Fig. 3 is a section taken at III—III of Fig. 1.

In general, the air vent shown is of a type designed to be installed easily and quickly on the topside of the auxiliary droppable fuel tanks used on airplanes above the highest fuel level in the tank, such that in the normal operation of the airplane, passage of air into the tank is permitted in order to preclude the possibility of forming a vacuum therein. The vent includes a cut-off arrangement embodying a float valve which prevents escape of fuel therethrough in other than normal flight of the airplane, as e. g. in a dive or glide.

The vent, as shown in the drawing, comprises sections of tubing 2 and 3, which are telescoped, as shown, in a friction or press fit at 12. Part 2 has the inner edge thereof bent inwardly to define a constricted opening 9 bordered by inturned peripheral edge portion 10.

Part 3 is provided in the substantial midportion thereof with transverse holes 6 and has its lower end formed into flanges or fingers 11 which are bent inwardly to define a cage for the float 7.

In assembling the parts of the vent, the float 7 is inserted into part 3 to rest upon the inturned fingers 11 in normal position. Part 2 is then forced into part 3 in a press fit at 12 to the relation shown. The assembly is held in place in the neck of the tank fitting 4 by clamp 5. The outer end of the part 2 may be curved over to protect against foreign matter dropping into the vent.

The float is thus retained in part 3 between the inturned edge portion 10 of part 2 and the inturned fingers 11 of part 3.

In normal flight positions, the float 7 rests on fingers 11 of part 3 so that air enters the tank through part 2, opening 9, and holes 6 of part 3.

In a dive or glide of the airplane, the fuel level 8 within the tank moves towards the vent and enters tube portion 3 past the fingers 11 to force the float 7 to rise to abutting relation with the inturned edge portion 10, thereby closing opening 9 and otherwise covering the holes 6 such that during the dive or glide, the possibility of escape of fuel from the tank 1 is reduced to a minimum.

Upon return of the airplane to normal flight position, as the fuel level drops below the vent in the tank, the float automatically drops to a point uncovering the opening 9 and clearing holes 6 to permit the passage of air into the tank, as aforesaid.

All of the parts 2, 3, 5 and 7 are made from standard parts and can be made to suit requirements by simple operations. Parts 2 and 3 could be made of a single piece of tubing, the seat 10 being made by proper crimping, etc.

Obviously, many changes in form and design may be made without departing from the scope of this invention as defined in the appended claims.

The invention described herein may be manufactured and used by or for the Government of the United States of America for governmental purposes without the payment of any royalties thereon or therefor.

What is claimed is:

1. An air vent comprising a light tubular member adapted for a tight slidable insertion in a corresponding opening in the top of a tank and having a seat with an opening therein formed in proximity of the point where the member passes through the top of the tank and made by a turned end of a telescopic sleeve inserted in said tubular member, and a float valve freely slidable in said member having a surface to fit said seat and being retained in said member by tongues bent inwardly at the lower end thereof.

2. An air vent for a tank comprising a light tube having a force fit in the top wall of said tank, a float in said tube and means in said tube defining a cage for said float including a supporting inward projection at the inner end of said tube on which the float is disposed in normal open position, said tube having air holes in the walls thereof above the normal position of the float, a light tubular extension telescoped within said tube having its inner end defining a vent and seat above the air holes in said tube, said float being slidable in the cage between said projection and seat for closing the vent and overlying the air holes in said tube to prevent liquid spilling therethrough when the liquid level in the tank rises to the level of said air holes.

3. An air vent for a tank comprising a light tube having a force fit in the top wall of said tank, a float in said tube, and means in said tube defining a cage for said float, said tube having air holes in the walls thereof above the normal position of the float, means in said tube defining a vent and seat above the air holes in said tube, inturned projections in the end of said tube for retaining the float in said tube, said float being slidable in the tube between said projection and seat for closing the vent and overlying the air holes in said tube to prevent liquid spilling therethrough when the liquid level in the tank rises to the level of said air holes.

4. A tubular fitting with a flange fixed over an opening in the uppermost wall of a tank and having a light tubular neck portion, a light tubular member passed through said neck portion and held in place by a clamp around said neck portion, said member having a sleeve therein with a perforated inner end forming a valve seat and normally serving as a vent, inturned projections at the inner end of said member, and a float valve freely slidable in said member between said seat and said projections for cutting off said vent by seating on said seat when the liquid level in the tank rises to the level thereof to prevent its accidental spilling therethrough.

5. A fitting as defined in claim 4, wherein said member is perforated below said valve seat to facilitate normal venting when the valve is open, said perforations being obstructed by the valve in its closed position.

HERMAN LOMBARD.

REFERENCES CITED

The following references are of record in the file of this patent:

UNITED STATES PATENTS

| Number | Name | Date |
| --- | --- | --- |
| 485,386 | Jackson | Nov. 1, 1892 |
| 538,339 | Morrison | Apr. 30, 1895 |
| 570,284 | Humphreys | Oct. 27, 1896 |
| 690,350 | Bolger | Dec. 31, 1901 |
| 763,724 | Collis | June 28, 1904 |
| 873,883 | Morgan | Dec. 17, 1907 |
| 927,893 | Steiger | July 13, 1909 |
| 1,006,403 | Robertson | Oct. 7, 1911 |
| 1,368,970 | Roberts | Feb. 15, 1921 |
| 1,538,049 | Mack | May 19, 1925 |
| 1,721,331 | Bugatti | July 16, 1929 |
| 1,794,670 | Colvin | Mar. 3, 1931 |
| 2,066,202 | Jay | Dec. 29, 1936 |
| 2,286,765 | Simpson | June 24, 1941 |